United States Patent [19]

Griffin

[11] 4,266,807
[45] May 12, 1981

[54] COLLAPSIBLE FRAME STRUCTURE FOR A CHILD'S PUSH CHAIR

[76] Inventor: Peter G. Griffin, 80 Hembs Crescent, Great Barr, Birmingham, England

[21] Appl. No.: 59,002

[22] Filed: Jul. 19, 1979

[30] Foreign Application Priority Data

Nov. 23, 1977 [GB] United Kingdom ............... 48727/77

[51] Int. Cl.³ .............................................. B62B 7/06
[52] U.S. Cl. ...................................... 280/650; 280/42; 280/642; 280/644; 280/649; 297/45
[58] Field of Search ............... 280/642, 644, 643, 649, 280/650, 647, 42; 297/45, 42

[56] References Cited

U.S. PATENT DOCUMENTS

| | | | |
|---|---|---|---|
| 2,847,058 | 8/1958 | Lee | 280/42 X |
| 3,390,893 | 7/1968 | MacLaren | 280/650 |
| 4,019,757 | 4/1977 | Beger et al. | 280/649 |

FOREIGN PATENT DOCUMENTS 1154362  6/1969  United Kingdom ...................... 280/42

Primary Examiner—John J. Love
Assistant Examiner—Milton L. Smith
Attorney, Agent, or Firm—Ladas & Parry

[57] ABSTRACT

A collapsible frame structure for the body of a child's push chair has a pair of side frames between which a collapsible X-frame is pivotally connected. Each side frame has when erected, a pair of upright members and two diagonal members which are pivotally connected to the upright members adjacent their ends. The diagonal members have a pivotal interconnection and each diagonal member has a hinge between this pivotal interconnection and one of the pivotal connections between each diagonal member, and an upright member. Toggles are provided for maintaining the X-frame extended. Extensions of the respective diagonal members provide handles for the push chair and a support for the back of a fabric chair.

6 Claims, 6 Drawing Figures

COLLAPSIBLE FRAME STRUCTURE FOR A CHILD'S PUSH CHAIR

TECHNICAL FIELD

This invention relates to a collapsible frame structure, and in particular to such a structure when incorporated in a child's push-chair which can be collapsed in three dimensions into a closely-bundled configuration of a relatively small cross-section. Such structures are frequently referred to as "stick-folding" structures.

BACKGROUND ART

It is known for example from British Pat. No. 1,154,362, to provide push chairs of the stick-folding type, these chairs being arranged so that, in use, a child occupying the chair faces away from the person pushing the chair. It has, however, been discovered that the pushers of such chairs would prefer to be faced by the child occupant.

One reason for these prior art chairs being arranged so that the child faces away from a pusher of the chair is that the handle portions of the chair frame also form part of the chair back. Since the handles must overhang the rear wheels of the chair by a sufficient amount to allow a pusher to take a pace of a reasonable length, the centre of gravity of a child which is leaning against the chair back is sufficiently close to the rear wheels as to present a danger that the chair may tip over backwards. This danger is much increased if an additional weight, as for example shopping, is hung on the handles of the chair.

Push chairs of the type in question are commonly provided with a foot rest for the child occupant. In prior art chairs it is possible for the child to remove its feet from the rest and trail them, within the chair frame, on the ground over which the chair is passing. If the child's feet catch on a projection, such as a curb, the child may be injured.

It is an object of the invention to provide a stick-folding space frame which can provide the body of a child's push chair, in which a child can face towards the person pushing the chair.

It is another object of the invention to provide a stick-folding space frame which can provide the body of a child's push chair, and wherein the space frame elements which provide support for the chair back are not also required to act as handles for pushing the chair, whereby a child occupant may be located so that its weight tends to counterbalance any additional weight which is hung on the chair handles.

It is a subsidiary object of the invention to provide a push chair in which a child occupying the chair is prevented from resting its feet on the ground beneath the chair frame.

DISCLOSURE OF INVENTION

According to the invention there is provided a collapsible volume structure comprising, when extended, a pair of side frames in substantially parallel planes, each side frame having first and second elongate members which are maintained in spaced relationship by third and fourth elongate members which extend between respective opposite corners of a quadrilateral which is defined by two points on each of said first and second members, said third and fourth members being pivotally interconnected and also pivotally connected to said points on the first and second members, hinge means for allowing said third and fourth members to be folded intermediate their pivotal interconnection and their connection with a first two of the adjacent corners on said quadrilateral, said adjacent corners being defined by points on respective ones of said first and second members, a collapsible X frame in a plane transverse to the planes of the side frames respective ends of said X frame being pivotally connected to two locations on respective ones of said side frames adjacent the other two corners of said quadrilateral, and means for maintaining said X frame extended.

BRIEF DESCRIPTION OF THE DRAWINGS

In the drawings corresponding parts have been given identical reference numerals.

BEST MODE OF CARRYING OUT THE INVENTION

Figure 1:
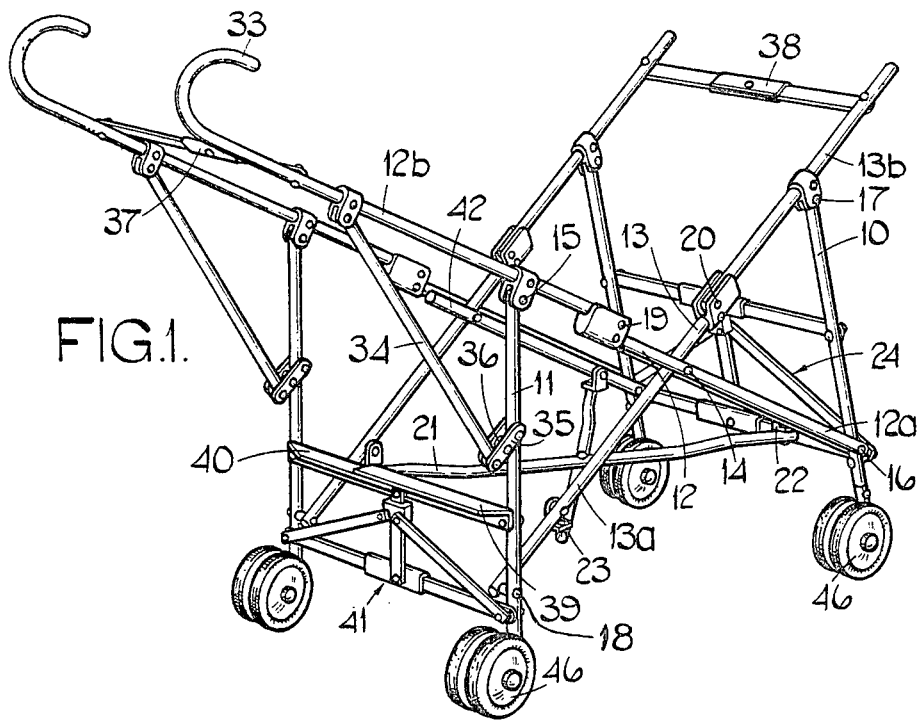
FIG. 1 is a pictorial view of the frame of a push chair.

The chair frame shown in its extended state in FIG. 1 has two identical side frames, one of which will be described in detail.

Two tubular elongate members 10, 11 are maintained in spaced relationship by two diagonally arranged tubular elongate members 12, 13. The members 12, 13 are pivotally interconnected at 14. The member 12 is connected to the members 10, 11, adjacent their ends, by pivots 15, 16 which define diagonally opposite corners of a notional quadrilateral. The member 13 is similarly connected to the members 10, 11 by pivots 17, 18 which define the other two corners of the aforesaid notional quadrilateral.

The pivotal connections 15, 17 are provided by plastic brackets which are secured to the respective members 12, 13 and which pivotally engage the respective members 11, 10. The members 10, 11 have as shown in FIG. 1 an inclination towards one another, so that the pivots 15, 17 are closer together than the pivots 16, 18. The member 12 is provided with a hinge 19 between the interconnection 14 and the corner 15. The hinge 19 includes a plastic bracket secured to one part 12a of the member 12 and pivotally supporting the other part 12b of the member 12, so that in the extended condition shown in FIG. 1 the parts 12a, 12b are in contact and lie substantially parallel.

The member 13 is provided with a hinge 20, similar to the hinge 19, between the interconnection 14 and the corner 17, the hinge 20 dividing the member 13 into two parts 13a, 13b.

Figure 2:
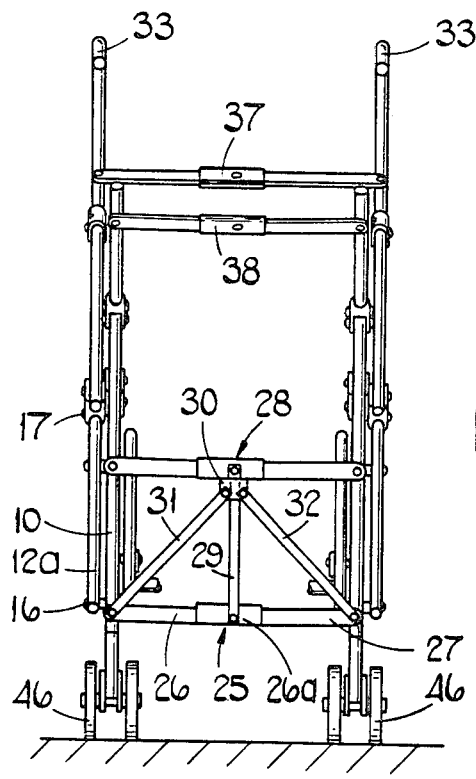
FIG. 2 shows a linkage for maintaining the chair frame extended.
Figure 5:
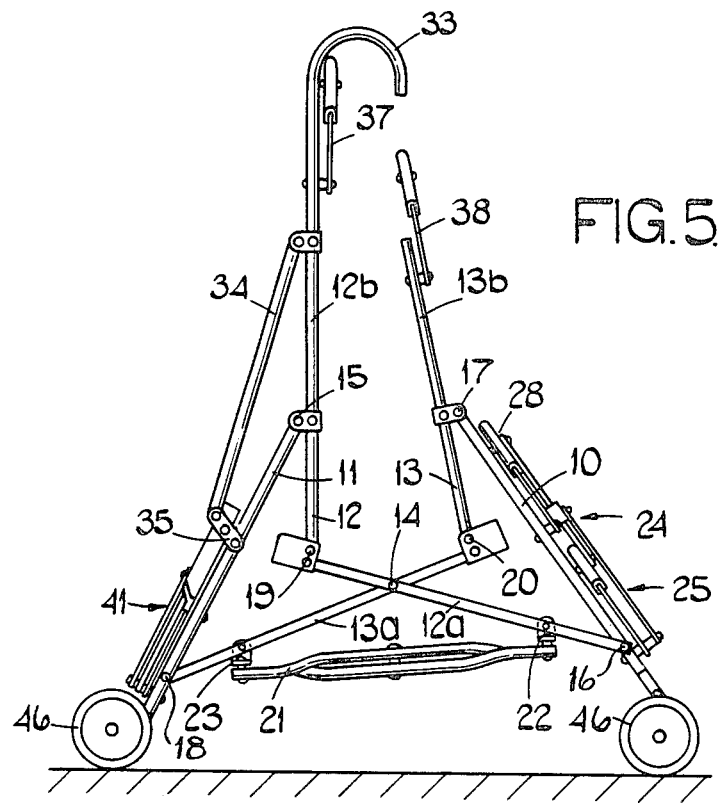
FIG. 5 is a side view of the push chair frame in a partly collapsed condition.

The side frame described above and the corresponding side frame on the other side of the chair lie in parallel planes. A collapsible X frame 21 lies in a plane perpendicular to the planes of the side frames. A free end of the X frame 21 has an articulated connection 23 to the part 13a adjacent the pivot 16. Another end of the X frame 21 also has an articulated connection 22 to the part 12a adjacent the pivotal connection 18. The other two ends of the X frame 21 are articulatedly connected to corresponding points on the other side frame. The two elements forming the X frame 21 are similar and their centre portions are laterally displaced, as indicated in FIG. 5, so that the X frame ends all lie in a single horizontal plane when the chair frame is extended. The foregoing articulated connections are conveniently provided by small angle brackets whose respective arms are pivotally mounted on the parts to be connected. Maintaining the X frame 21 extended serves to maintain the chair frame as a whole extended. An over-centering linkage 24 is pivotally connected between the member 10 and the corresponding member on the other side frame. The linkage 24 is shown in more detail in FIG. 2 and includes a toggle 25 which comprises pivotally interconnected bars 26, 27 the free end of the bar 26 being pivotally connected to the member 10 adjacent the pivot 16, and the free end of the bar 27 being pivotally connected to a corresponding point on the other side frame. In the erected state of the chair frame the toggle 25 is in an over-centre position, in which a part 26a of the bar 26 abuts the bar 27, whereby any force tending to move the side frames towards one another maintains the toggle 25 locked. The effective length of the toggle 25 is such as to urge the X frame 21 to the maximum extended position permitted by the side frame dimensions and their points of interconnection with the X frame 21. There will thus be a slight compressive stress on the toggle 25 maintaining it in its over centre position, and this stress will be assisted by the weight of a child occupying the chair.

The linkage 24 includes a further over-centering toggle 28, identical with the toggle 25, the toggle 28 being pivotally connected to the member 10 and to a corresponding point on the other side frame. A bar 29 interconnects the centre pivots of the toggles 25, 28 so that the corresponding elements of these toggles are maintained parallel in all operating positions of the linkage 24. The bar 29 passes through a slider 30. Two struts 31, 32 are pivotally mounted at the respective interconnections between the side frames and the toggle bars 26, 27. The struts 21, 32 are also pivotally connected to the slider 30 and their lengths are such that, in the over-centre position of the linkage 24, the slider 30 firmly abuts the toggle 28.

The part 12b of the member 12 extends beyond the pivot 15 and terminates in a handle 33. The overhanging portion of the part 12b is stayed against bending about the pivot 15, in response to downward pressure on the handle 33, by a strut 34. One end of the strut 34 pivotally engages the part 12b and the other end of the strut 34 is pivotally engaged between the ends of two parallel arms which form a link 35. The other end of the link 35 pivotally engages the member 11 between the pivot connections 15 and 18. A plastic buffer 36 is secured between the arms of the link 35 and in the extended condition of the frame the buffer 36 engages the member 11, and thus restrains the strut 34 from moving downwards.

An over-centering toggle 37 similar to the toggles 25, 28 extends between the overhanging portion of the part 12b and a corresponding point on the other side frame.

The part 13b of the member 13 extends beyond the pivot connection 17, to support a back rest of a chair, to be described. A fourth over-centering toggle 38 also similar to the toggles 25, 28 is pivotally connected to the part 13b adjacent its free end, and is also pivotally connected to a corresponding point on the other side frame.

A further over-centering toggle, comprising two pieces of angle section 39, 40 is pivotally connected to the member 11 adjacent the pivot 18 and to a corresponding point on the other side frame. This toggle forms the upper toggle of an over-centering linkage 41, generally similar to the linkage 24 previously described.

Figure 4:
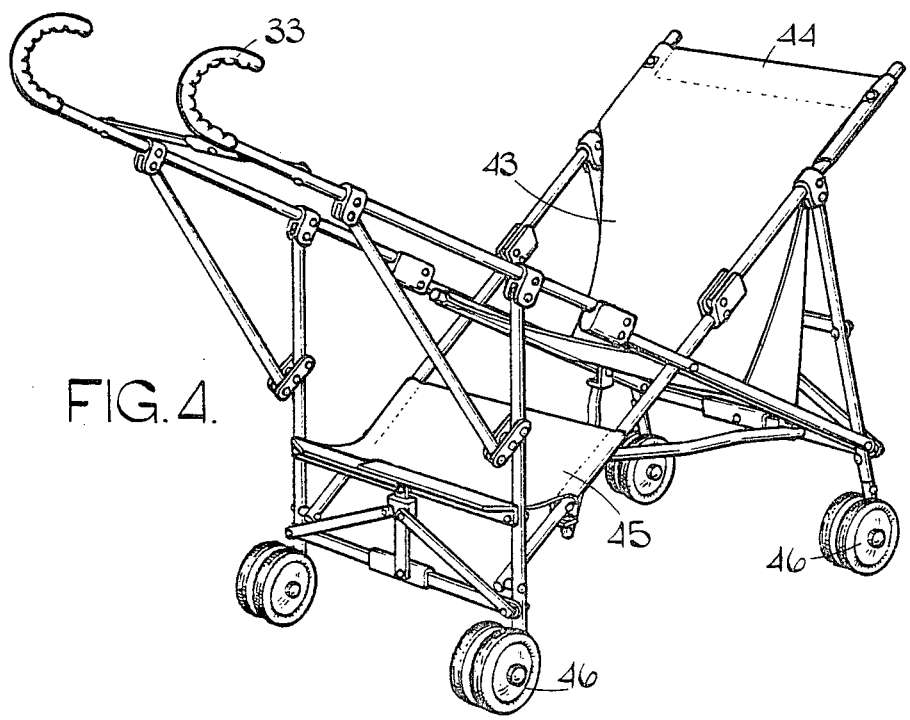
FIG. 4 is a view, corresponding to FIG. 1, of the push chair frame with a seat attached.

A bar 42 is secured between the pivot connections 14 and 16 of each side frame, and extends parallel to the part 12a. In FIG. 1 one of the bars 42 has been indicated, for the sake of clarity, on the side frame not otherwise described in detail. The bars 42 provide means for securing the base of a fabric seat 43 to the parts 12a of the members 12 of both side frames as shown in FIG. 4. The back of the seat 43 is secured to the overhanging portions of the parts 13b. The top edge of the seat back has a deep hem 44 which contains padding. This padding lies adjacent the toggle 38 and prevents the head of a child from striking the toggle 38 through the fabric of the seat. The seat 43 is preferably provided with a safety harness, of a known type, for retaining a child in the chair.

A further fabric piece 45 extends between the lower ends of the parts 13a, and also has its bottom edge secured to the angle sections 39, 40 of the linkage 41, the sections 39,40 forming a foot rest. The purpose of the piece 45 is to prevent the feet of a child occupying the chair from being trailed on the ground between the arms of the X frame 21.

The lower ends of the members 10, 11 are each provided with double wheels 46. Preferably the wheels 46 are mounted for limited movement in a vertical plane, relative to the members 10, 11. Between the axles of the wheels 46 and the members 10, 11 is a resilient element which is compressed as the members 10, 11 move downwards relative to the wheels, under a vertical load. The arrangement provides for absorbence of shocks as the chair is moved over an irregular surface. Preferably one of the pairs of double wheels, either on the members 10 or on the members 11, is free to pivot about the axes of the respective members on which they are mounted. Steering of the chair is thereby facilitated. The pivotal mountings of wheels will, in addition, be such as to provide a castor action as indicated in the drawings.

Figure 3:
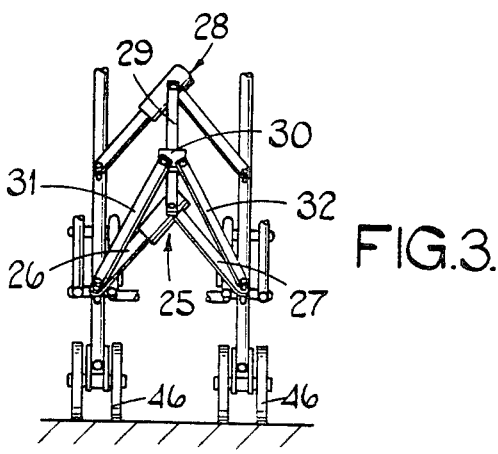
FIG. 3 shows the linkage of FIG. 2 in a partly collapsed condition.
Figure 6:
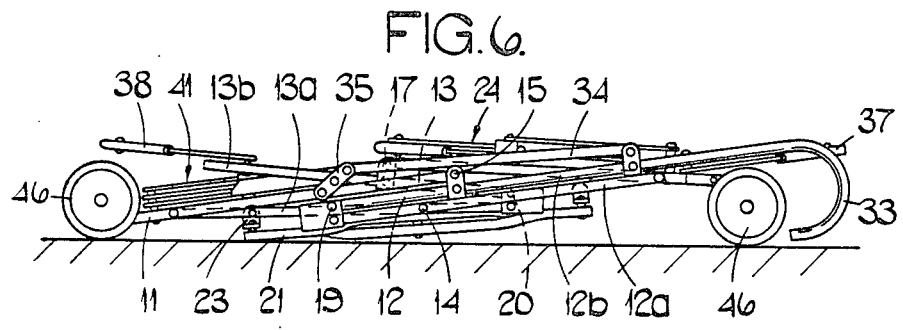
FIG. 6 is a side view of the push chair in its fully collapsed condition.

When the chair is to be collapsed, the linkages 24, 41 and the toggles 37, 38 are released from their over-centre positions and the parts 12b and 13b urged towards one another, as shown in FIG. 5. Release of the toggles and linkages enables the X frame 21 to collapse and the distance between the pivot points 16, 18 to increase. At the same time the members 12, 13 fold about their respective hinges 19, 20. Collapse of the X frame 21 also allows the two collapsing side frames to move towards one another, as indicated in FIG. 3 until the condition shown in FIG. 6 is reached, in which condition the chair is collapsed in all three dimensions.

One or more suitable catches may be provided to retain the structure in its fully collapsed state.

I claim:

1. A collapsible frame structure for a child's push chair, the structure comprising, when extended, a pair of side frames in substantially parallel planes, a collapsible X frame in a plane transverse to the planes of the side frames, respective ends of said X frame being pivotally connected to two locations on each of said side frames, means for maintaining said X frame extended, and wheels adjacent the free ends of the X frame, characterised in that each said side frame has first and second elongate members (10, 11) which are maintained in spaced relationship by third and fourth (12, 13) elongate members which extend between respective opposite corners (15, 16 and 17, 18) of a quadrilateral which is defined by two points on each of said first (10) and second (11) members, said third (12) and fourth (13) members being pivotally interconnected and also pivotally connected to said points (15, 16, 17, 18) on the first (10) and second (11) members, and hinge means (19) for allowing said third (17) and fourth (13) members to be folded intermediate their pivotal interconnection (14) and their respective connections with a first two (17,15) of the adjacent corners on said quadrilateral, said adjacent corners being defined by points on respective ones (10, 11) of said first and second members, respective ends of said X frame (21) being pivotally connected to two locations (22, 23) on each of said side frames adjacent the other two corners (16, 18) of said quadrilateral.

2. A collapsible frame structure as claimed in claim 1, said wheels (46) being located on each side frame adjacent said other two corners (16, 18) of said quadrilateral, said third (12) and fourth (13) members of each side frame extending from respective ones of said first two corners (17, 15) on sides thereof remote from the pivotal interconnections (14) of said third and fourth members (12, 13) said extensions respectively providing handles (33) for pushing the structure and means for supporting a back of a seat (43) within the struction.

3. A collapsible frame structure as claimed in claim 1 or claim 2 in which the means for maintaining the X frame (21) extended comprises a first over-centering linkage (24) having upper and lower over-centering toggles (25, 28) each having a pivotal connection to both side frames and being foldable about a central pivot, a member (29) interconnecting said central pivots, a slider (30) mounted on said member (29), and a pair of struts (31, 32) pivotally connected to said slider (30) and to respective ones of the pivotal connections between said side frames and the elements (26, 27) forming one (25) of said over-centering toggles.

4. A collapsible frame structure as claimed in claim 3 which includes a second said over-centering linkage (41), said first linkage (24) extending between said first members (10) of the side frames, and said second linkage (41) extending between said second members (11) of the side frames.

5. A child's push chair comprising a collapsible frame structure as claimed in claim 4, and a foldable fabric seat (43) having its base secured to said third members (12) and its back secured to said fourth members (13), and a foldable fabric piece having opposite edges secured to said fourth members (13) and a third edge secured to the upper toggle (39, 40) of said second linkage (41).

6. A child's push chair comprising a collapsible frame structure as claimed in claim 1, and a foldable fabric seat (43) having its base secured to said third members (12) and its back secured to said fourth members (13).

* * * * *